(12) United States Patent (10) Patent No.: US 7,896,491 B1
Lin (45) Date of Patent: Mar. 1, 2011

(54) EYEGLASSES LEG MOUNT STRUCTURE

(75) Inventor: Kuo-Tseng Lin, Taipei (TW)

(73) Assignee: T-Link PPE Ltd., Taipei (TW)

( * ) Notice: Subject to any disclaimer, the term of this patent is extended or adjusted under 35 U.S.C. 154(b) by 0 days.

(21) Appl. No.: 12/771,821

(22) Filed: Apr. 30, 2010

(51) Int. Cl.
*G02C 5/14* (2006.01)
(52) U.S. Cl. ........................... 351/120; 351/156
(58) Field of Classification Search ............. 351/120, 351/116, 118, 119, 111, 156, 41
See application file for complete search history.

(56) References Cited

U.S. PATENT DOCUMENTS 6,454,406 B1* 9/2002 Guo ........................... 351/120
6,776,483 B1* 8/2004 Wu ............................ 351/120
6,883,914 B1* 4/2005 Yang .......................... 351/120

* cited by examiner

*Primary Examiner*—Hung X Dang
(74) *Attorney, Agent, or Firm*—WPAT, P.C.; Anthony King

(57) ABSTRACT

An eyeglasses leg mount structure includes two connecting units, each movably installed on an eyeglasses frame and each interconnected to an insert slot, wherein the insert slots are tapered inwardly from distal surfaces of the connecting units, and a shaft hole is formed on each connecting unit and interconnected to the insert slot, and each connecting unit includes an interfering portion; and two leg mount units, each having a pair of connecting parts disposed at an end of the connecting unit and inserted into the insert slot, wherein each leg mount unit includes an elastic plate installed on a side of the connecting part and pivotally coupled to the shaft hole, and each leg mount unit includes a latch portion corresponding to the interfering portion, so as to allow users to adjust the eyeglasses and remove eyeglasses legs or an eyeglasses strap conveniently.

16 Claims, 13 Drawing Sheets

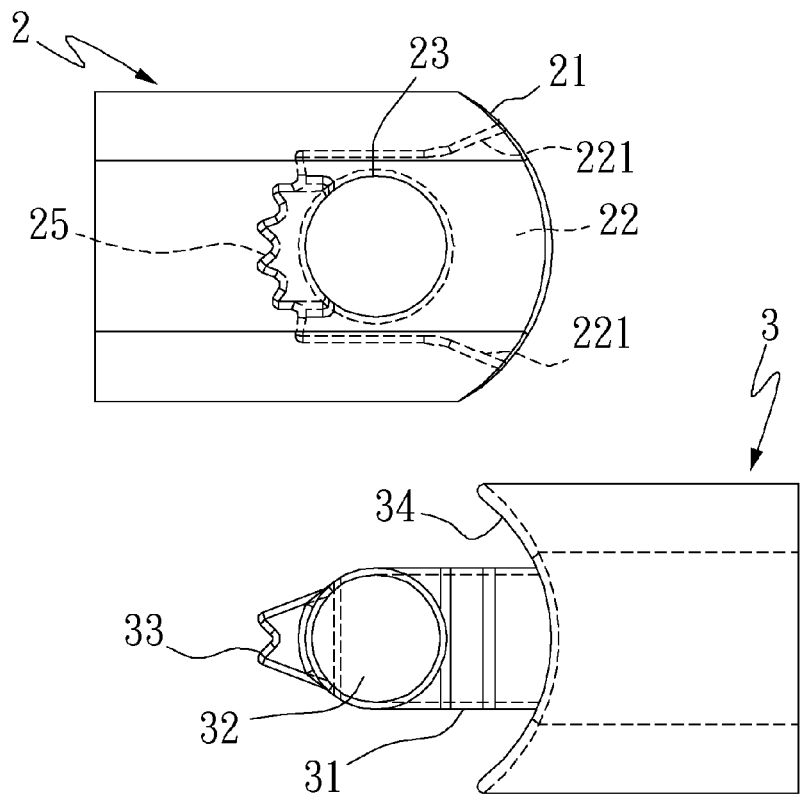
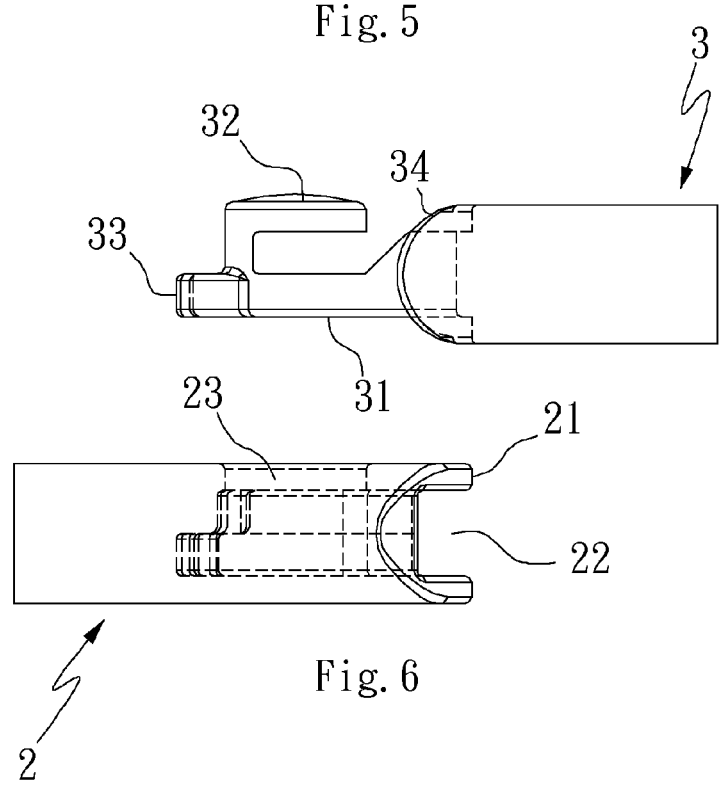
Fig. 5
Fig. 6

EYEGLASSES LEG MOUNT STRUCTURE

FIELD OF THE INVENTION

The present invention relates to an eyeglasses leg mount structure, in particular to an eyeglasses leg mount structure capable of making an angle adjustment and positioning the eyeglasses legs of a pair of eyeglasses, such that the eyeglasses legs or an eyeglasses strap can be removed directly from a connecting unit to meet different wearing requirements.

BACKGROUND OF THE INVENTION

A pair of conventional eyeglasses is mainly composed of an eyeglasses frame, two eyeglasses legs, a clamp portion having a through hole and disposed separately on both sides of the eyeglasses frame, a pivot portion disposed at an end of each eyeglasses leg and coupled to the clamp portion, and a fixing hole formed on the pivot portion and corresponding to the through hole. The through hole and the fixing hole are coupled with each other by a fixing element, so that each eyeglasses leg is movably and separately coupled to both sides of the eyeglasses frame, and users can spread open each eyeglasses leg to wear the eyeglasses, or fold each eyeglasses leg for storing the eyeglasses.

Although each eyeglasses leg of the aforementioned conventional eyeglasses can be spread open for wearing the eyeglasses, and each eyeglasses leg can be folded for the storage of the eyeglasses, yet each eyeglasses leg is connected by the pivot portion at an end of each eyeglasses leg, the clamp portions on both sides of the eyeglasses frame, and the fixing element, and only sidewalls of the clamp portions and the pivot portions are provided for stopping the eyeglasses legs when the eyeglasses legs are spread open. Furthermore, the conventional eyeglasses do not come with any design of an adjusting structure to allow users to make adjustments to the eyeglasses legs appropriately to cope with various wearing requirements. Since the pivot portion is installed at an end of each eyeglasses leg and the fixing element is separately connected to the clamp portions on both sides of eyeglasses frame, a special small tool is required to remove the fixing element in order to replace the eyeglasses leg. Obviously, it is relatively uneasy and inconvenient for users to remove and replace the eyeglasses leg.

Therefore, it is a main subject for related manufacturers to develop an eyeglasses leg mount structure capable of adjusting an angle and positioning the eyeglasses legs of the eyeglasses, such that the eyeglasses legs or an eyeglasses strap can be removed directly from a connecting unit to meet different wearing requirements.

SUMMARY OF THE INVENTION

In view of the foregoing shortcomings of the conventional eyeglasses leg mount structure, the inventor of the present invention based on years of experience in the related industry to conduct extensive researches and experiments, and finally developed an eyeglasses leg mount structure, in hope of achieving the effect of adjusting an angle and positioning the eyeglasses legs of the eyeglasses, such that the eyeglasses legs or eyeglasses strap can be removed directly from a connecting unit to meet different wearing requirements.

Therefore, it is a primary objective of the present invention to provide an eyeglasses leg mount structure, and the installation of a connecting unit and a leg mount unit on both sides of the eyeglasses frame allows users to make an angle adjustment and position an eyeglasses leg or eyeglasses strap, and to remove the eyeglasses leg or eyeglasses strap from the connecting unit directly for a repair or replacement, and thus the structure can achieve the effect of meeting different wearing requirements.

To achieve the foregoing and other objectives, the present invention provides an eyeglasses leg mount structure, comprising: two connecting units, each movably installed on a side of an eyeglasses frame, and formed with an insert slot interconnected to a distal surface of each connecting unit, wherein the insert slots are tapered inwardly from distal surfaces of the connecting units, and a shaft hole is formed on a surface of each connecting unit and interconnected to the insert slot, and each of the connecting units includes an interfering portion; and two leg mount units, each having a pair of connecting parts disposed at an end of the connecting unit and inserted into the insert slot, wherein each of the leg mount units includes an elastic plate, and the elastic plates are installed on sides of the pair of connecting parts respectively, and pivotally coupled to the shaft hole, and each of the leg mount units includes a latch portion corresponding to the interfering portion.

The eyeglasses leg mount structure of the present invention can achieve the effects of making an angle adjustment and positioning the eyeglasses legs or the eyeglasses strap by the connecting unit and the leg mount unit, and also allowing users to remove the eyeglasses legs or the eyeglasses strap from the connecting unit directly for a repair or a replacement to satisfy different wearing requirements.

BRIEF DESCRIPTION OF THE DRAWINGS

FIG. 5 is a third exploded view of a first preferred embodiment of the present invention;

FIG. 6 is a fourth exploded view of a first preferred embodiment of the present invention;

DESCRIPTION OF THE PREFERRED EMBODIMENTS

Figure 1:
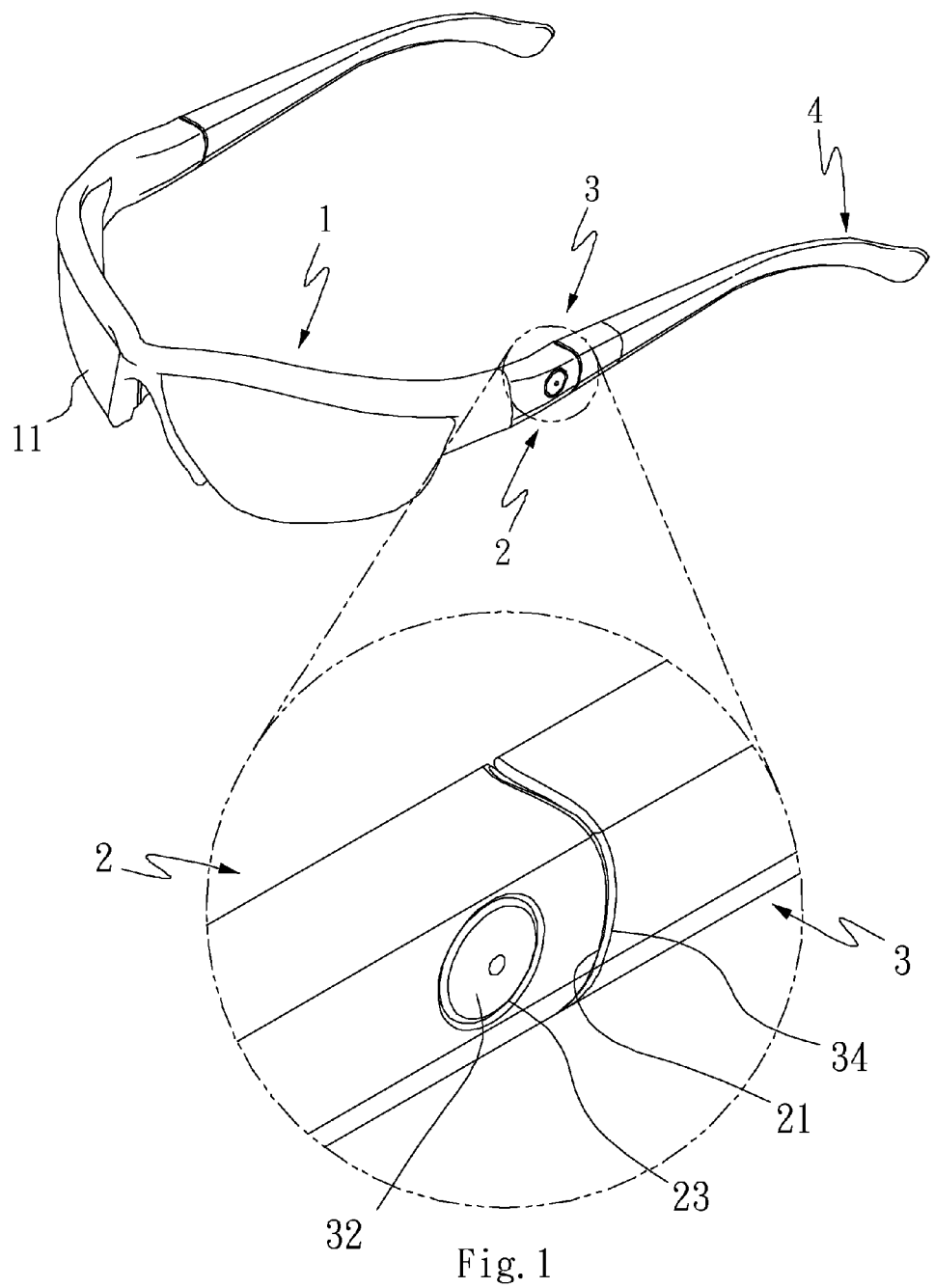
FIG. 1 is a perspective view, showing an application of the present invention.
Figure 2:
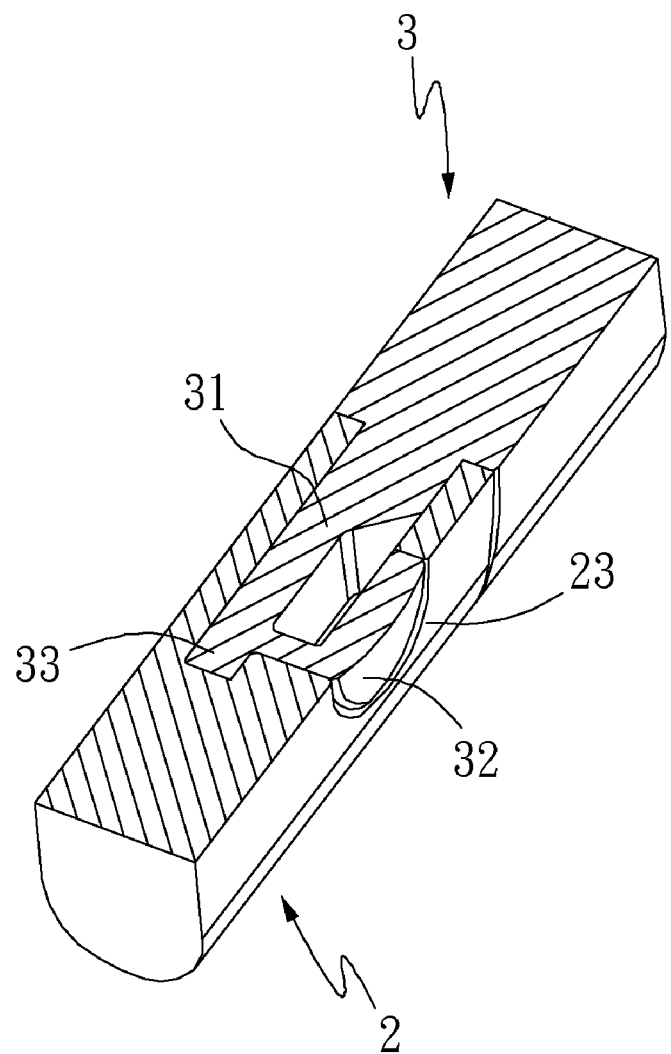
FIG. 2 is a first cross-sectional view of a first preferred embodiment of the present invention.
Figure 3:
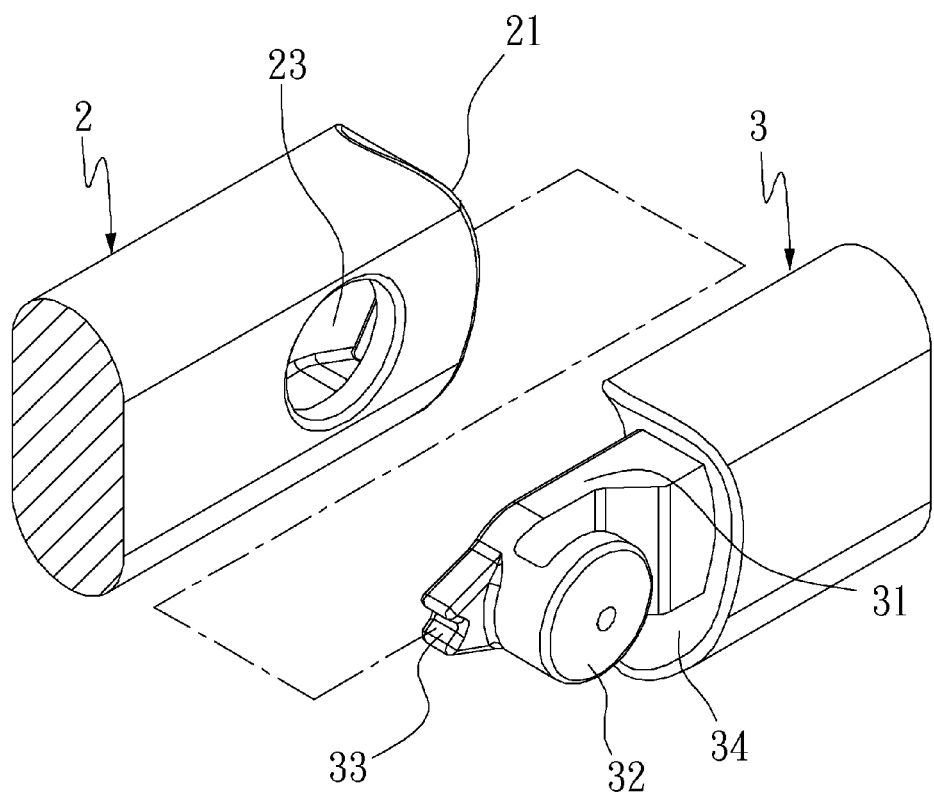
FIG. 3 is a first exploded view of a first preferred embodiment of the present invention.
Figure 4:
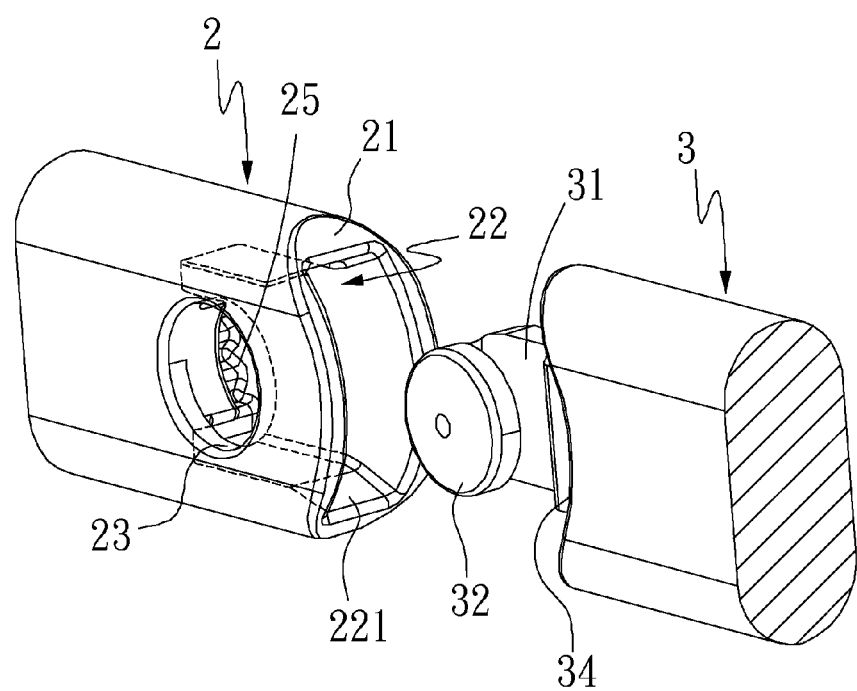
FIG. 4 is a second exploded view of a first preferred embodiment of the present invention.
Figure 7:
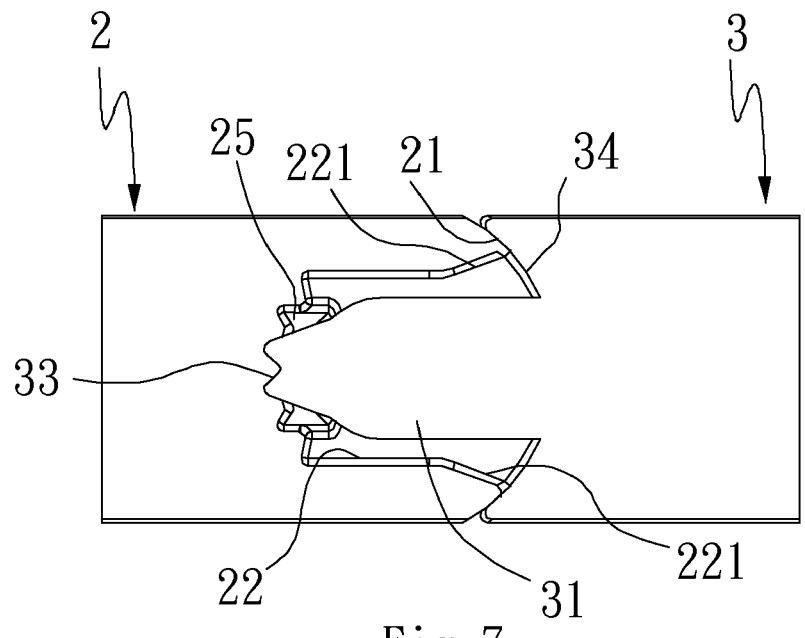
FIG. 7 is a second cross-sectional view of a first preferred embodiment of the present invention.
Figure 8:
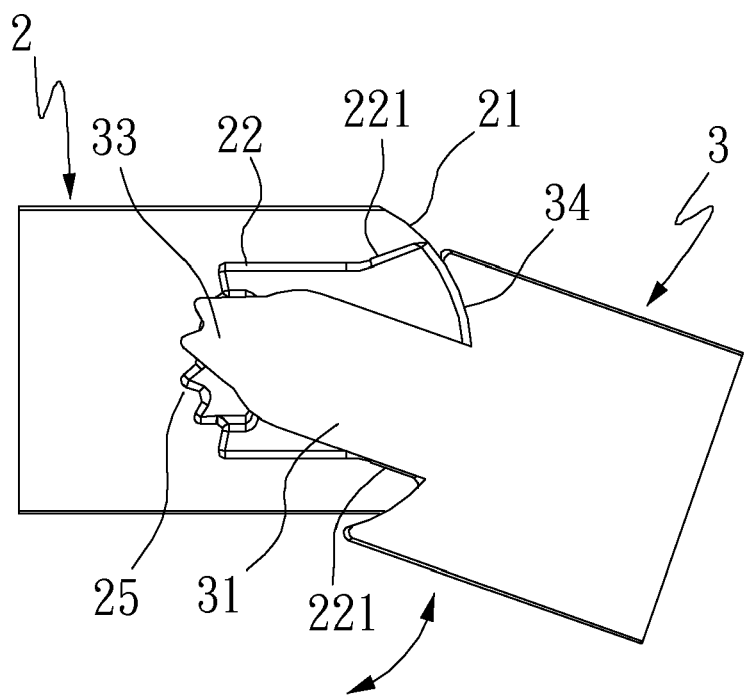
FIG. 8 is a cross-sectional view of a using status in accordance with a first preferred embodiment of the present invention.
Figure 9:
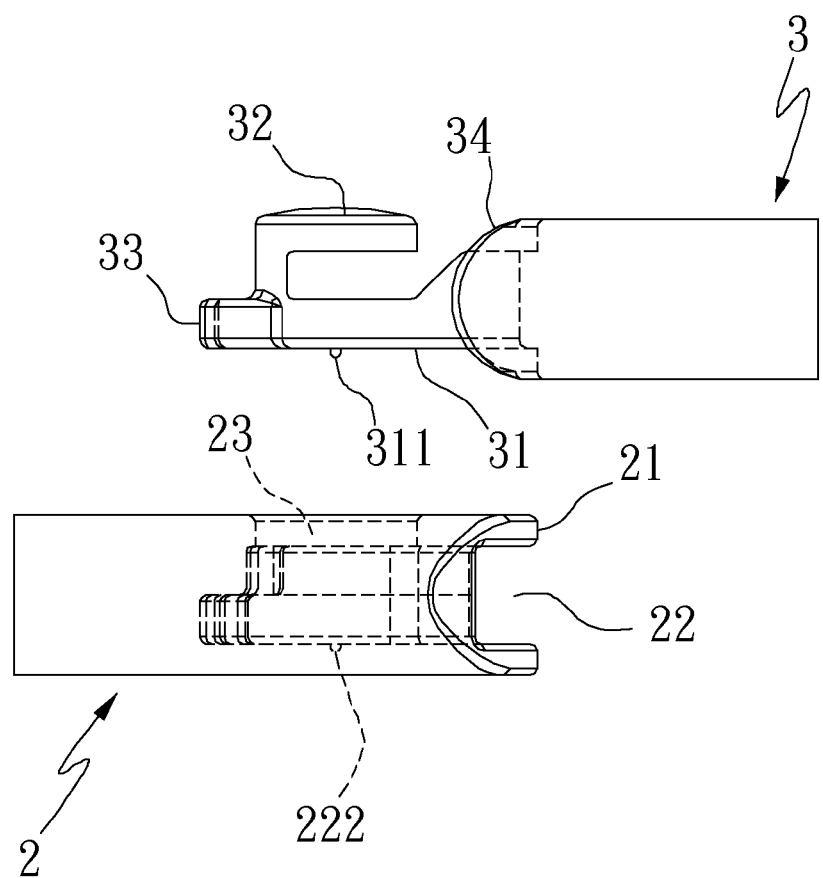
FIG. 9 is a fifth exploded view of a first preferred embodiment of the present invention.

The objects, characteristics and effects of the present invention will become apparent with the detailed description of preferred embodiments and the illustration of related drawings as follows.

With reference to FIGS. 1 to 9 for a first perspective view of an application, a first cross-sectional view, first to fourth exploded views, a second cross-sectional view, a cross-sectional view of a using status, and a fifth exploded view of an eyeglasses leg mount structure in accordance with a first preferred embodiment of the present invention respectively, the eyeglasses leg mount structure comprises two connecting units 2 and two leg mount units 3.

Each of the two connecting units 2 is movably installed on a side of an eyeglasses frame 1, and the eyeglasses frame 1 includes a lens 11, and each connecting unit 2 includes an insert slot 22 interconnected to a distal surface of the connecting unit 2 and inwardly tapered from the distal surface of the connecting unit 2, and an interfering portion 25 having a shaft hole 23 formed on a surface of each connecting unit 2 and interconnected to the insert slot 22. The two leg mount units 3 include a pair of connecting parts 31 disposed at ends of the two leg mount units 3 and inserted into the insert slots 22 respectively. Each leg mount units 3 includes an elastic plate 32 and the elastic plates 32 respectively are installed on sides of the connecting parts 31 and pivotally coupled to the shaft hole 23, a latch portion 33 corresponding to the interfering portion 25, and an eyeglasses leg 4 coupled to another end of each leg mount unit 3.

The elastic plates 32 are in a circular shape, and the elastic plates 32 are provided for installing the leg mount units 3 into the connecting units 2, or removing the leg mount units 3 from the connecting units 2, and the elastic plates 32 together with the shaft holes 23 are used for turning the leg mount units 3 with respect to the connecting units 2.

The interfering portion 25 can be a serrated surface separately formed at the bottom of the insert slot 22, and the latch portions 33 can be disposed at an end of the pair of connecting parts 31 and include at least one tooth-shaped body for making an angle adjustment and positioning each leg mount unit 3 and each connecting unit 2.

A convex portion 311 is formed separately on another side of the pair of connecting parts 31 and corresponding to the center of the elastic plate 32, and a concave portion 222 is formed separately on a side of the insert slots 22, and the convex portion 311 is disposed at the concave portion 222, and each elastic plate 32 together with each shaft hole 23 and each convex portion 311 together with each concave portion 222 are provided for assuring that each leg mount unit 3 can be turned axially with respect to each connecting unit 2.

Figure 10:
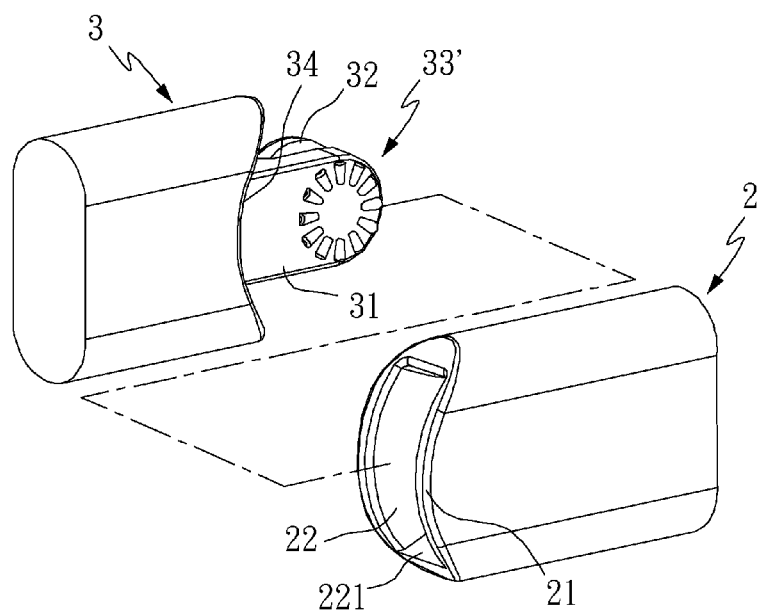
FIG. 10 is a first exploded view of a second preferred embodiment of the present invention.
Figure 11:
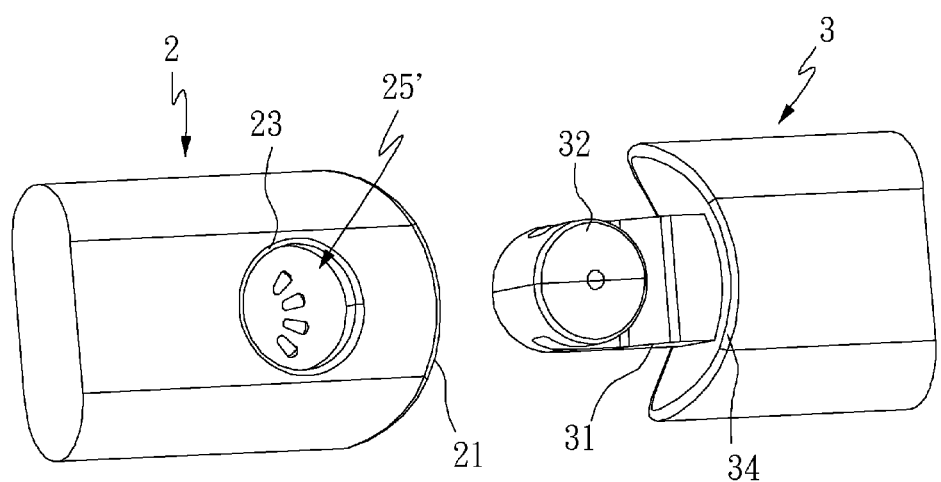
FIG. 11 is a second exploded view of a second preferred embodiment of the present invention.
Figure 12:
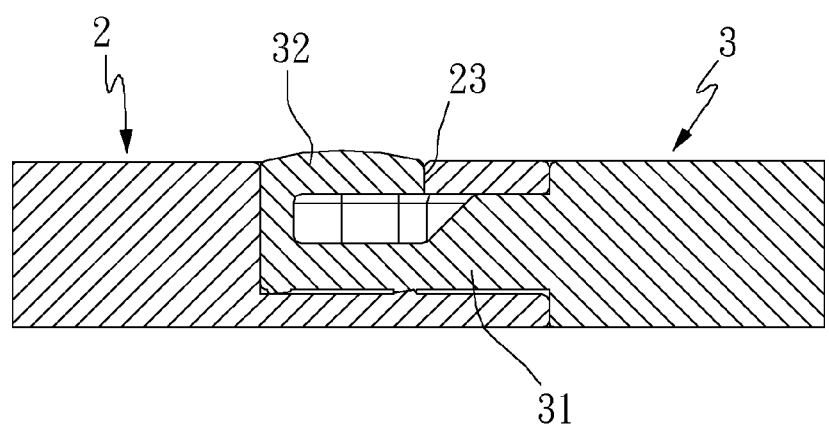
FIG. 12 is a cross-sectional view of a second preferred embodiment of the present invention.

With reference to FIGS. 10 to 12 for a first exploded view, a second exploded view and a cross-sectional view of a second preferred embodiment of the present invention respectively, the interfering portions 25' can be a serrated surface separately disposed on a side of the insert slot 22, and the latch portions 33' can be separately disposed on another side of the pair of connecting parts 31 and include at least one tooth-shaped body for making an angle adjustment and positioning each leg mount unit 3 and each connecting unit 2 similarly.

Figure 13:
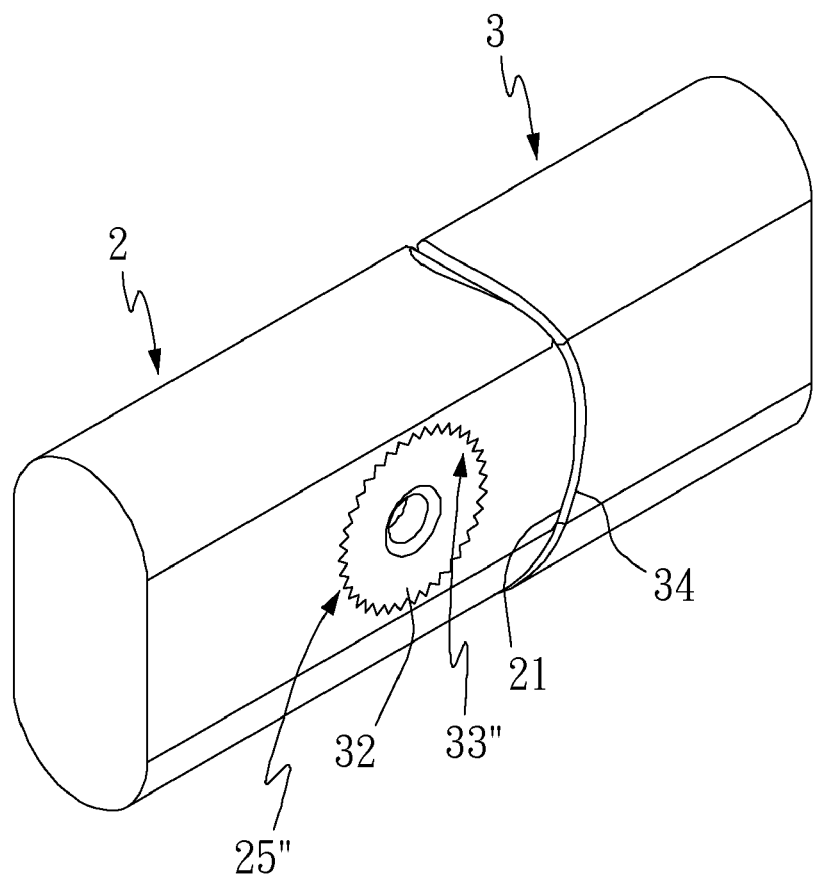
FIG. 13 is a perspective view of a third preferred embodiment of the present invention.
Figure 14:
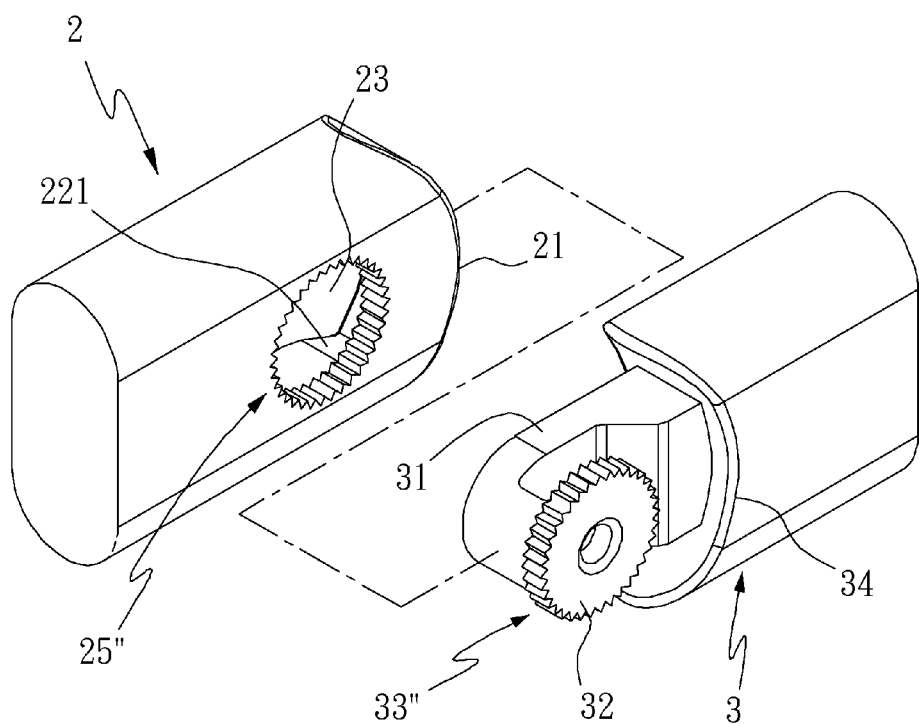
FIG. 14 is an exploded view of a third preferred embodiment of the present invention.

With reference to FIGS. 13 and 14 for a perspective view and an exploded view respectively of a third preferred embodiment of the present invention, the interfering portions 25" can be a serrated surface separately disposed at the periphery of the shaft hole 23, and the latch portions 33" can be disposed at the periphery of the elastic plate 32 and include at least one tooth-shaped body for making an angle adjustment and positioning each leg mount unit 3 and each connecting unit 2 similarly.

A circular arc portion 21 is separately formed at a distal surface of the connecting units 2, and a concave arc portion 34 is separately formed at an end of the leg mount unit 3 and abutted against the circular arc portion 21, and each circular arc portion 21 together with each concave arc portion 34 are provided for turning each leg mount unit 3 with respect to each connecting unit 2 more stably.

A stop portion 221 is separately formed on two internal sides proximate to openings of the insert slots 22 for limiting the adjusting angle of each leg mount unit 3.

When the present invention is used, each eyeglasses leg 4 can be directly and separately installed onto both sides of the eyeglasses frame 1 through the connecting unit 2 and the leg mount unit 3 and spread open for wearing the eyeglasses. If it is necessary to adjust an angle of each eyeglasses leg 4, an external force is applied downwardly (or upwardly) to the leg mount unit 3, such that the elastic plate 32 of each leg mount unit 3 can be turned in each shaft hole 23. Now, the insert slot 22 is tapered inwardly towards the distal surface of the connecting unit 2, so that the connecting part 31 has enough spaces to move up and down, and the connecting part 31 can be moved up (or down) to making an adjustment to a desired angle. When the leg mount unit 3 is turned at an end of the connecting unit 2, the concave arc portion 34 of each leg mount unit 3 and the circular arc portion 21 of each connecting unit 2 are provided for making the movement smoother. After each leg mount unit 3 on each connecting unit 2 is adjusted to a desired angle, a side of the connecting part 31 and the stop portion 221 on one of the sides of the insert slot 22 are abutted with each other to provide a stopping effect, while the latch portion 33 at an end of the connecting part 31 is being latched with the interfering portion 25 to provide a positioning effect, such that each connecting unit 2 and each leg mount unit 3 are provided for making an angle adjustment and positioning each eyeglasses leg 4 to achieve the effect of satisfying different wearing requirements.

If it is necessary to remove each eyeglasses leg 4, the elastic plate 32 on a side of the connecting part 31 is pressed directly, such that the elastic plate 32 is retracted in a direction towards the connecting part 31 and separated from the shaft hole 23. Now, the leg mount unit 3 is pulled in a direction away from the connecting unit 2, such that the connecting part 31 of the leg mount unit 3 is separated from the insert slot 22 of the connecting unit 2 to remove the original leg mount unit 3 from the connecting unit 2 in order to change the eyeglasses leg with another eyeglasses leg (not shown in the figure). When the other eyeglasses leg is to be connected through the leg mount unit 3 and the connecting unit 2, the corresponding connecting part 31 of the leg mount unit 3 is inserted into the insert slot 22 of the connecting unit 2 such that the elastic plate 32 on a side of the connecting part 31 is embedded into the shaft hole 23. Now, the latch portion 33 at an end of the pair of connecting parts 31 is latched to the interfering portion 25 at the bottom of the insert slot 22 to complete the connection of the leg mount unit 3 with the connecting unit 2.

Figure 15:
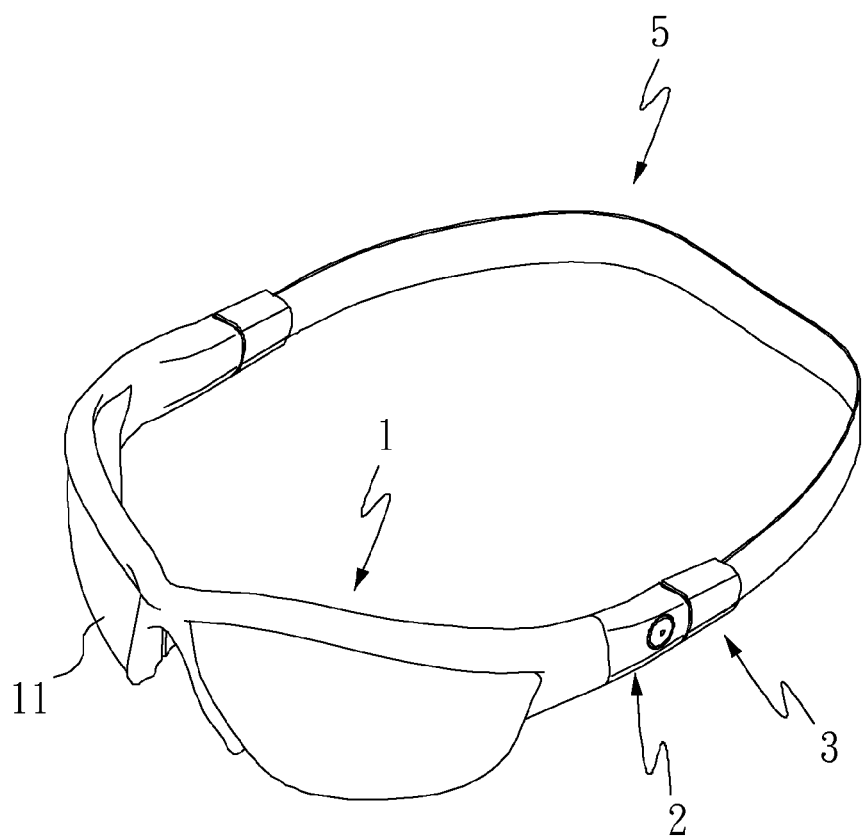
FIG. 15 is a perspective view, showing an application of the present invention.

With reference to FIG. 15 for another perspective view of an application of the present invention, each leg mount unit 3 can be connected to an eyeglasses leg 4 or an eyeglasses strap 5. If a user uses the eyeglasses strap 5 to wear the eyeglasses frame 1, the eyeglasses strap 5 will often cover the user's ears (not shown in the figure), thereby causing discomfort or hearing hindrance to users. The eyeglasses leg mount structure of the present invention can turn each leg mount unit 3 upward, such that the eyeglasses strap 5 can be moved above the ear to avoid inconvenience to users.

Figure 16:
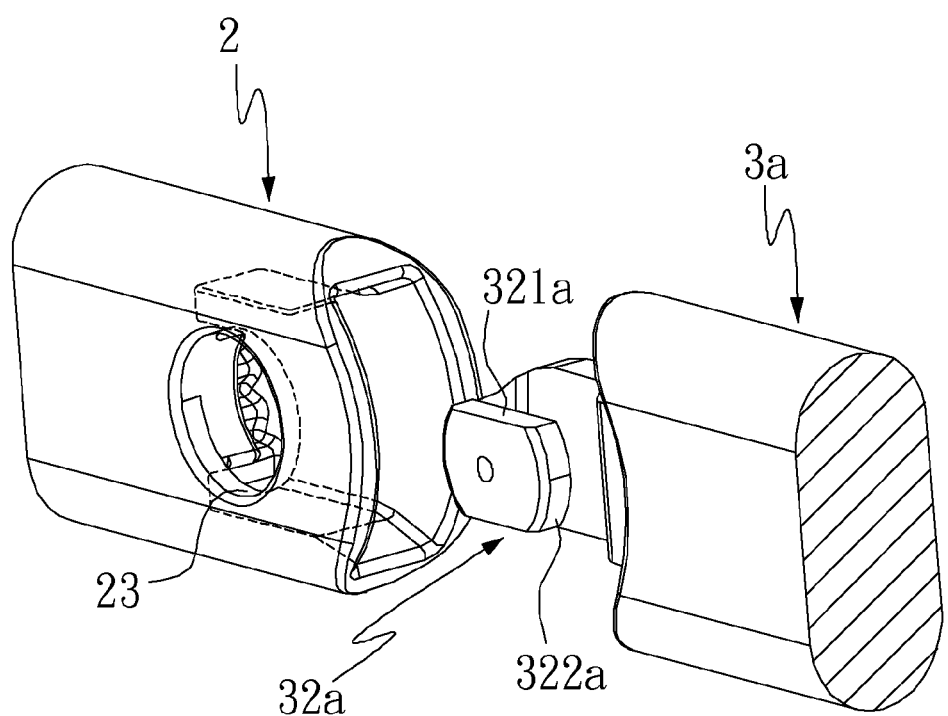
FIG. 16 is an exploded view of a fourth preferred embodiment of the present invention.

With reference to FIG. 16 for an exploded view of a fourth preferred embodiment of the present invention, the structure of the fourth preferred embodiment is similar to that of the first preferred embodiment with a difference that the periphery of each elastic plate 32a is comprised of at least one circular arc and at least one straight line, such that a plane 321a is separately disposed on both sides of the elastic plate 32a of each leg mount unit 3a, and a circular arc surface 322a is separately formed at both ends of each elastic plate 32a, such that the elastic plate 32a of each leg mount unit 3a is separately and movably coupled into the shaft hole 23 of each connecting unit 2 to achieve the effects of the first preferred embodiment. In addition, a gap is formed between each shaft hole 23 and each elastic plate 32a to improve the smoothness of the turning.

The connecting part 31 of the leg mount unit 3 is inserted into the insert slot 22 of the connecting unit 2, and then the elastic plate 32 of the leg mount unit 3, the shaft hole 23 of the connecting unit 2, and the insert slot 22 tapered from a distal surface of the connecting unit 2 are provided for achieving the connecting and turning effects between the connecting unit 2 and the leg mount unit 3, and then the latch portion 33, 33', 33" of the leg mount unit 3 and the interfering portion 25, 25', 25" of the connecting unit 2 are provided for achieving the positioning effect between the connecting unit 2 and the leg mount unit 3. The design of the shaft hole 23 and the elastic plate 32 allows the connecting unit 2 to connect to and detach from the leg mount unit 3, and the insert slot 22 tapered inwardly from the distal surface of the connecting unit 2 can turn the leg mount unit 3 at the center of the elastic plate 32 and with respect to the connecting unit 2, and then the interfering portion 25, 25', 25" and the latch portion 33, 33', 33" are used for positioning each other. Therefore, the eyeglasses leg mount structure of the present invention can install or remove the leg mount unit 3 onto or from connecting unit 2, or turn the leg mount unit 3 with respect to the connecting unit 2 to adjust an angle of the leg mount unit 3 and positioning the leg mount unit 3.

In summation of the description above, the present invention comes with the design of the connecting unit and the leg mount unit installed on both sides of the eyeglasses frame for making an angle adjustment and positioning the eyeglasses leg or eyeglasses strap, and allowing users to remove the eyeglasses leg or the eyeglasses strap from the connecting unit directly to meet different wearing requirements. Obviously, the invention complies with the patent application requirements, and products derived from the present invention also meet the present market requirement sufficiently.

While the invention has been described by means of specific embodiments, numerous modifications and variations could be made thereto by those skilled in the art without departing from the scope and spirit of the invention set forth in the claims.

What is claimed is:

1. An eyeglasses leg mount structure, comprising:
   two connecting units, each movably installed on a side of an eyeglasses frame, and formed with an insert slot interconnected to a distal surface of each connecting unit, and the insert slots being respectively and inwardly tapered from the distal surfaces of the connecting units, and a shaft hole being formed on a surface of each connecting unit and interconnected to the insert slot, and each of the connecting units having an interfering portion; and two leg mount units, having a pair of connecting parts formed separately at ends of the two leg mount units and inserted into the insert slots respectively, and each of the leg mount units having an elastic plate, and each of the elastic plates and sides of the pair of connecting parts having a space between said elastic plates and said sides of the pair of connecting parts and portions of the elastic plates being respectively connected to sides of the pair of connecting parts and pivotally coupled to the shaft hole, and each of the leg mount units having a latch portion corresponding to the interfering portion.

2. The eyeglasses leg mount structure of claim 1, wherein the interfering portions are serrated surfaces disposed at the bottom of the insert slots respectively, and the latch portions are disposed at an end of each of the connecting parts and include at least one tooth-shaped body.

3. The eyeglasses leg mount structure of claim 2, wherein each of the connecting parts includes a convex portion disposed on another side of each connecting part and corresponding to the center of the elastic plate, and each of the insert slots includes a concave portion disposed on a side of the each insert slot, and each of the convex portions is disposed at each of the concave portions.

4. The eyeglasses leg mount structure of claim 3, wherein each of the connecting units includes a circular arc portion disposed on a distal surface of the connecting unit, and a concave arc portion disposed at an end of the leg mount unit and abutted against the circular arc portion.

5. The eyeglasses leg mount structure of claim 4, wherein each of the insert slots includes a stop portion disposed proximate to both internal sides of an opening separately.

6. The eyeglasses leg mount structure of claim 2, wherein each of the connecting units includes a circular arc portion disposed on a distal surface of the connecting unit, and a concave arc portion disposed at an end of the leg mount unit and abutted against the circular arc portion.

7. The eyeglasses leg mount structure of claim 6, wherein each of the insert slots includes a stop portion disposed proximate to both internal sides of an opening separately.

8. The eyeglasses leg mount structure of claim 1, wherein each of the interfering portions is a serrated surface disposed on a side of the insert slot, and each of the latch portions is disposed on another side of the pair of connecting parts and includes at least one tooth-shaped body.

9. The eyeglasses leg mount structure of claim 8, wherein each of the connecting units includes a circular arc portion disposed on a distal surface of the connecting unit, and a concave arc portion disposed at an end of the leg mount unit and abutted against the circular arc portion.

10. The eyeglasses leg mount structure of claim 9, wherein each of the insert slots includes a stop portion disposed proximate to both internal sides of an opening separately.

11. The eyeglasses leg mount structure of claim 1, wherein each of the interfering portions is a serrated surface disposed at the periphery of the shaft hole, and each of the latch portions is disposed at the periphery of the elastic plate and includes at least one tooth-shaped body.

12. The eyeglasses leg mount structure of claim 11, wherein each of the connecting units includes a circular arc portion disposed on a distal surface of the connecting unit, and a concave arc portion disposed at an end of the leg mount unit and abutted against the circular arc portion.

13. The eyeglasses leg mount structure of claim 12, wherein each of the insert slots includes a stop portion disposed proximate to both internal sides of an opening separately.

14. The eyeglasses leg mount structure of claim 1, wherein each of the connecting units includes a circular arc portion disposed on a distal surface of the connecting unit, and a concave arc portion disposed at an end of the leg mount unit and abutted against the circular arc portion.

15. The eyeglasses leg mount structure of claim 14, wherein each of the insert slots includes a stop portion disposed proximate to both internal sides of an opening separately.

16. The eyeglasses leg mount structure of claim 1, wherein the elastic plates having a periphery comprised of at least a circular arc and at least one straight line.

* * * * *